Patented Apr. 10, 1928.

1,665,383

UNITED STATES PATENT OFFICE.

ARNOLD M. TAYLOR AND FRANK A. BUOTE, OF STAMFORD, CONNECTICUT, ASSIGNORS TO ATLAS POWDER COMPANY, OF WILMINGTON, DELAWARE, A CORPORATION OF DELAWARE.

FLOOR FILLER WITH PYROXYLIN BASE.

No Drawing.   Application filed January 29, 1925.  Serial No. 5,620.

This invention relates to a floor filler having a pyroxylin base, the object of the invention being to provide a floor filler which will dry rapidly, clean off easily, fill the pores of the wood well, and be unaffected by pyroxylin solutions which may be used as the final finishing materials.

The first step in finishing floors, at the present time, is the application of a floor filler. This material invariably has an oil base, which requires a long time to dry and contains as a filling material a substance which is very hard and extremely difficult to remove, when a floor has to be refinished. In addition to these disadvantages, a filler of this nature is entirely unsuited for use under pyroxylin lacquers because the oil in the filler keeps the pyroxylin lacquer film soft and the pyroxylin lacquer has a decided tendency to deprive the filler of color, if the filler has been tinted with earth pigments.

We have discovered that we can produce a floor filler which eliminates all of these disadvantages by preparing a clear pyroxylin lacquer which, when it dries, will either partially or completely precipitate the lacquer solids. These precipitated lacquer-solids act as the binding material for the inert filling substance which is essential for filling the pores of the wood. As a filling material, we prefer to use a substance which is non-crystalline and soft, so that it can be easily removed in case a floor has to be refinished. A substance of this nature is corn starch.

In preparing this filler we dissolve nitrocellulose in a mixture of solvents and incorporate certain gums and resins, such as dammar gum and the glycerol ester of rosin. When the nitrocellulose, gums and resins are completely dissolved we mix in a quantity of starch, preferably corn starch. We adjust our solvent composition so that when the pyroxylin lacquer dries, it either partially, or completely, precipitates the lacquer solids, in a very fine state of division. These precipitated lacquer solids envelop the starch particles and bind them together. We obtain sufficient adhesiveness so that the bound starch particles remain in the pores of the wood and the excess filler can be easily removed by any suitable waste material.

It is oftentimes desirable to tint the filler so that it will harmonize with the particular wood at hand and for tinting substances we prefer to use yellow ochre, burnt sienna, umber, etc., although we do not care to limit ourselves to the particular tinting materials we use.

By way of illustration, we cite the following formula as typical of a floor filler having a pyroxylin base.

|  | Per cent |
|---|---|
| Ethyl acetate | 10 |
| Denatured alcohol | 30 |
| Gasoline | 30 |
| Toluene | 30 |
|  | 100 |

2.2 ozs. nitrocellulose, 2.5 ozs. resin, 10 lbs. starch.

We wish to emphasize the fact that we contemplate the use of this floor filler under pyroxylin lacquers and varnishes. These substances are finding wide favor for floor finishing by reason of their highly water proof qualities. It is, therefore, of utility and importance to provide a filler which will properly combine with, and exert no detrimental effect upon, these floor finishing compositions.

Thus in finishing a floor we contemplate filling the same with our improved filler, removing the surplus by wiping with waste, excelsior, rags or other suitable material and when the filler has dried coating with a pyroxylin varnish or lacquer.

Having described our invention above in detail, we wish it to be understood that many changes may be made therein without departing from the spirit of our invention.

We claim:

1. A floor filler comprising the following ingredients, combined in substantially the proportions stated:

|  | Per cent. |
|---|---|
| Ethyl acetate | 10 |
| Denatured alcohol | 30 |
| Gasoline | 30 |
| Toluene | 30 | with 2.2. ozs. nitrocellulose, 2.5 ozs. resin, and 10 lbs. soft, non-crystalline corn starch.

2. The herein described method of preparing porous surfaces for the reception of pyroxylin finishing coatings, which consists of applying to said surface a filling composition comprising a pyroxylin base, a solvent for the same, a diluent and a soft non-crystalline starch, and wherein the solvent and diluents are so adjusted that on drying, the lacquer solids are precipitated in a fine state of division and envelop and bind the starch particles in the pores of the surface to be finished.

3. A filling composition for use in preparing porous wooden surfaces for the reception of pyroxylin finishing coatings, which comprises a pyroxylin base, a solvent for the same, a diluent and a soft, non-crystalline starch, and wherein the solvent and diluents are so adjusted that on drying, the lacquer solids are precipitated in a fine state of division and envelop and bind the starch particles in the pores of the wood.

4. A filling composition for use in preparing porous wooden surfaces for the reception of pyroxylin finishing coatings, which comprises a pyroxylin base, a solvent for the same, a diluent and a soft, non-crystalline pigment, and wherein the solvent and diluents are so adjusted that on drying the lacquer solids are precipitated in a fine state of division and envelop and bind the pigment particles in the pores of the wood.

5. A filling composition for use in preparing porous wooden surfaces for the reception of pyroxylin finishing coatings, which comprises a pyroxylin base, a solvent for the same, a diluent and a soft, non-crystalline solid, and wherein the solvent and diluents are so adjusted that on drying the lacquer solids are precipitated in a fine state of division.

6. A filling composition for use in preparing porous wooden surfaces for the reception of pyroxylin finishing coatings, which comprises a pyroxylin base, a solvent for the same, a diluent and a finely divided filler, and wherein the solvent and diluents are so adjusted that on drying the lacquer solids are precipitated in a fine state of division.

In testimony whereof they affix their signatures.

ARNOLD M. TAYLOR.
FRANK A. BUOTE.